US010542283B2

United States Patent
Kumar (10) Patent No.: US 10,542,283 B2
(45) Date of Patent: Jan. 21, 2020

(54) DISTRIBUTED VIDEO ENCODING/DECODING APPARATUS AND METHOD TO ACHIEVE IMPROVED RATE DISTORTION PERFORMANCE

(71) Applicant: Wipro Limited, Bangalore (IN)

(72) Inventor: Kodavalla Vijay Kumar, Bangalore (IN)

(73) Assignee: Wipro Limited, Bangalore (IN)

( * ) Notice: Subject to any disclaimer, the term of this patent is extended or adjusted under 35 U.S.C. 154(b) by 184 days.

(21) Appl. No.: 15/067,531

(22) Filed: Mar. 11, 2016

(65) Prior Publication Data

US 2017/0244979 A1 Aug. 24, 2017

(30) Foreign Application Priority Data

Feb. 24, 2016 (IN) .............................. 201641006369

(51) Int. Cl.
*H04N 19/567* (2014.01)
*H04N 19/577* (2014.01)
(Continued)

(52) U.S. Cl.
CPC ......... *H04N 19/567* (2014.11); *H04N 19/103* (2014.11); *H04N 19/137* (2014.11);
(Continued)

(58) Field of Classification Search
None
See application file for complete search history.

(56) References Cited

U.S. PATENT DOCUMENTS

2005/0243917 A1* 11/2005 Lee ..................... H04N 19/176
375/240.03
2007/0253479 A1* 11/2007 Mukherjee ............. H03M 7/30
375/240.1
(Continued)

FOREIGN PATENT DOCUMENTS

WO   WO 2012/072637   6/2012

OTHER PUBLICATIONS

Chieh-Chuan Chiu et al., "Hybrid distributed video coding with frame level coding mode selection", Image Processing (ICIP), 2012 19th IEEE International Conference On, *IEEE*, Sep. 30, 2012, pp. 1561-1564.
(Continued)

*Primary Examiner* — Kate H Luo
(74) *Attorney, Agent, or Firm* — Finnegan, Henderson, Farabow, Garrett & Dunner, LLP (57) ABSTRACT

This disclosure relates generally to distributed video coding. In one embodiment, distributed video encoding apparatus to achieve improved rate distortion performance is disclosed. The distributed video encoding apparatus comprises a processor and a memory communicatively coupled to the processor. The memory stores processor instructions, which, on execution, causes the processor to receive at least one Group of Pictures (GOP) comprising at least one key frame and at least one Wyner-Ziv (WZ) frame. The processor further determines a first value that is indicative of a cumulative motion activity associated with the at least one GOP. The processor further classifies the at least one GOP into one of one or more high-motion WZ frames and one or more low-motion WZ frames based on the determined first value. The processor encodes the high-motion WZ frames using inter no-motion encoding. The processor further
(Continued)

encodes the one or more low-motion WZ frames using Wyner-Ziv encoding.

9 Claims, 4 Drawing Sheets

(51) Int. Cl.
  *H04N 19/172* (2014.01)
  *H04N 19/103* (2014.01)
  *H04N 19/137* (2014.01)
  *H04N 19/593* (2014.01)
  *H04N 19/30* (2014.01)

(52) U.S. Cl.
  CPC ......... *H04N 19/172* (2014.11); *H04N 19/395* (2014.11); *H04N 19/577* (2014.11); *H04N 19/593* (2014.11)

(56) References Cited

U.S. PATENT DOCUMENTS

| | | | | |
|---|---|---|---|---|
| 2009/0092326 | A1* | 4/2009 | Fukuhara | H04N 19/139 382/233 |
| 2009/0122860 | A1* | 5/2009 | Yin | H04N 19/61 375/240.02 |
| 2009/0316783 | A1* | 12/2009 | Au | H04N 19/46 375/240.15 |
| 2010/0165205 | A1* | 7/2010 | Namioka | G06T 5/003 348/606 |
| 2010/0166057 | A1* | 7/2010 | Huchet | H04N 19/46 375/240.01 |
| 2011/0103701 | A1* | 5/2011 | Cheon | G06T 9/00 382/233 |
| 2012/0033741 | A1* | 2/2012 | Nassor | H03M 7/3057 375/240.25 |
| 2013/0266078 | A1* | 10/2013 | Deligiannis | H04N 19/00533 375/240.25 |
| 2015/0249829 | A1* | 9/2015 | Koat | H04N 19/159 375/240.03 |
| 2015/0256850 | A1* | 9/2015 | Kottke | H04N 19/56 375/240.16 |
| 2016/0100011 | A1* | 4/2016 | Park | H04N 21/234327 709/219 |

OTHER PUBLICATIONS

Martins R et al., "Statistical motion learning for improved transform domain Wyner-Ziv video coding", *IET Image Processing*, vol. 4, No. 1, Feb. 4, 2010, pp. 28-41.

Jozef Skorupa et al., "Efficient low-delay distributed video coding", *IEEE*, vol. 22, No. 4, Apr. 2012, pp. 530-544.

V.K. Kodavalla et al., "Distributed video coding: CODEC architecture and implementation", *ResearchGate*, Signal & Image Processing (SIPIS), vol. 2, No. 1, Mar. 2011, pp. 151-163.

Catarina Brites et al., "Correlation noise modeling for efficient pixel and transform domain Wyner-Ziv video coding", *IEEE*, vol. 18, No. 9, Sep. 1, 2008, pp. 1177-1190.

Vijay Kumar et al., "Side information refinement scheme in transform domain distributed video coding", *IEEE*, Feb. 28, 2014, pp. 68-71.

European Search Report dated Jul. 1, 2016 in European Patent Office in counterpart European Patent No. Application 16162175.0. 14 pages.

* cited by examiner

FIG. 1

FIG. 2: A distributed video encoding method 200 for achieving improved rate distortion performance FIG. 3: A distributed video decoding method 300 for achieving improved rate distortion performance FIG. 4: Example Computer System

DISTRIBUTED VIDEO ENCODING/DECODING APPARATUS AND METHOD TO ACHIEVE IMPROVED RATE DISTORTION PERFORMANCE

TECHNICAL FIELD

This disclosure relates generally to distributed video coding, and more particularly to an apparatus and method for improving rate distortion performance in distributed video coding.

BACKGROUND

Generally, portable media devices have lower computational resources. However, in applications that require real-time transmission of visual communications over wireless communication networks, high computational resources may be required. Thus, for executing such applications in portable media devices, Distributed Video Coding (DVC) may be utilized. DVC may reduce the complexity of the encoder in the portable media devices by intra-coding a key frame in a Group of Pictures (GOP) using predictive video encoding standards and the remaining frames in the GOP using Wyner-Ziv (WZ) encoding. Thus, the computational resources used by the encoder in the portable media devices may be lower.

However, when high motion activity frames are present in the GOP, then a low rate distortion performance may be observed that may lead to a low video quality on the portable media devices. For example, low Peak Signal to Noise Ratio (PSNR) may be observed when the motion activity in the GOP is high. Additionally, error correction codes utilized in the DVC may not be effective when the motion activity in the GOP is high.

Thus, the conventional DVC apparatus may lead to video flicker whenever there is high motion activity within the GOP, thereby failing to provide an optimal rate distortion performance.

SUMMARY

In one embodiment, a distributed video encoding method for achieving improved rate distortion performance, is disclosed. The method comprises receiving, by a distributed video encoding apparatus, at least one Group of Pictures (GOP) comprising at least one key frame and at least one Wyner-Ziv (WZ) frame. The method further comprises determining, by the distributed video encoding apparatus, a first value that is indicative of a cumulative motion activity associated with the at least one GOP. The method further comprises classifying, by the distributed video encoding apparatus, the at least one GOP into one of one or more high-motion WZ frames and one or more low-motion WZ frames based on the determined first value. The method further comprises encoding, by the distributed video encoding apparatus, the one or more high-motion WZ frames using inter no-motion encoding. The method further comprises encoding, by the distributed video encoding apparatus, the one or more low-motion WZ frames using Wyner-Ziv encoding.

In one embodiment, a distributed video encoding apparatus to achieve improved rate distortion performance, is disclosed. The distributed video encoding apparatus comprises a processor and a memory communicatively coupled to the processor. The memory stores processor instructions, which, on execution, causes the processor to receive at least one Group of Pictures (GOP) comprising at least one key frame and at least one Wyner-Ziv (WZ) frame. The processor further determines a first value that is indicative of a cumulative motion activity associated with the at least one GOP. The processor classifies the at least one GOP into one of one or more high-motion WZ frames and one or more low-motion WZ frames based on the determined first value. The processor further encodes the one or more high-motion WZ frames using inter no-motion encoding. The processor further encodes the one or more low-motion WZ frames using Wyner-Ziv encoding.

In one embodiment, a distributed video decoding method for achieving improved rate distortion performance, is disclosed. The method comprises receiving, by a distributed video decoding apparatus, a plurality of encoded frames that comprise at least one predictive intra encoded frame and one of one or more inter no-motion encoded frames or one or more Wyner-Ziv encoded frames. The method further comprises identifying, by the distributed video decoding apparatus, the at least one predictive intra encoded frame, the one or more inter no-motion encoded frames or the one or more Wyner-Ziv encoded frames based on header information associated with each of the plurality of encoded frames. The method comprises decoding, by the distributed video decoding apparatus, the at least one predictive intra encoded frame using predictive intra decoding. The method comprises decoding, by the distributed video decoding apparatus, the one or more inter no-motion encoded frames using inter no-motion decoding. The method further comprises decoding, by the distributed video decoding apparatus, the one or more Wyner-Ziv encoded frames using Wyner-Ziv decoding.

In one embodiment, a distributed video decoding apparatus to achieve improved rate distortion performance, is disclosed. The distributed video decoding apparatus comprises a processor and a memory communicatively coupled to the processor. The memory stores processor instructions, which, on execution, causes the processor to receive a plurality of encoded frames that comprise at least one predictive intra encoded frame and one of one or more inter no-motion encoded frames or one or more Wyner-Ziv encoded frames. The processor identifies the at least one predictive intra encoded frame, the one or more inter no-motion encoded frames or the one or more Wyner-Ziv encoded frames based on header information associated with each of the plurality of encoded frames. The processor decodes the at least one predictive intra encoded frame using predictive intra decoding. The processor decodes the one or more inter no-motion encoded frames using Inter no-motion decoding. The processor further decodes the one or more Wyner-Ziv encoded frames using Wyner-Ziv decoding.

According to embodiments illustrated herein, a non-transitory computer-readable storage medium having stored thereon, a set of computer-executable instructions for causing a computer comprising one or more processors to perform steps of receiving, by a distributed video encoding apparatus, at least one Group of Pictures (GOP) comprising at least one key frame and at least one Wyner-Ziv (WZ) frame. The one or more processors may determine, by the distributed video encoding apparatus, a first value that is indicative of a cumulative motion activity associated with the at least one GOP. The one or more processors may classify, by the distributed video encoding apparatus, the at least one GOP into one of one or more high-motion WZ frames and one or more low-motion WZ frames based on the determined first value. The one or more processors may encode, by the distributed video encoding apparatus, the one or more high-motion WZ frames using Inter no-motion encoding. The one or more processors may encode, by the distributed video encoding apparatus, the one or more low-motion WZ frames using Wyner-Ziv encoding.

According to embodiments illustrated herein, a non-transitory computer-readable storage medium having stored thereon, a set of computer-executable instructions for causing a computer comprising one or more processors to perform steps of receiving, by a distributed video decoding apparatus, a plurality of encoded frames that comprise at least one predictive intra encoded frame, and either one or more inter no-motion encoded frames or one or more Wyner-Ziv encoded frames. The one or more processors may identify, by the distributed video decoding apparatus, the at least one predictive intra encoded frame, the one or more inter no-motion encoded frames, or the one or more Wyner-Ziv encoded frames based on header information associated with each of the plurality of encoded frames. The one or more processors may decode, by the distributed video decoding apparatus, the at least one predictive intra encoded frame using predictive intra decoding. The one or more processors may decode, by the distributed video decoding apparatus, the one or more inter no-motion encoded frames using inter no-motion decoding. The one or more processors may decode, by the distributed video decoding apparatus, the one or more Wyner-Ziv encoded frames using Wyner-Ziv decoding.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses an apparatus and method for achieving improved rate distortion performance. The apparatus and method may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the system and method may be implemented in other computing systems, albeit with a few variations, as will be understood by a person skilled in the art.

Working of the distributed video encoding/decoding apparatus and method for achieving improved rate distortion performance is described in conjunction with FIGS. 1-4. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
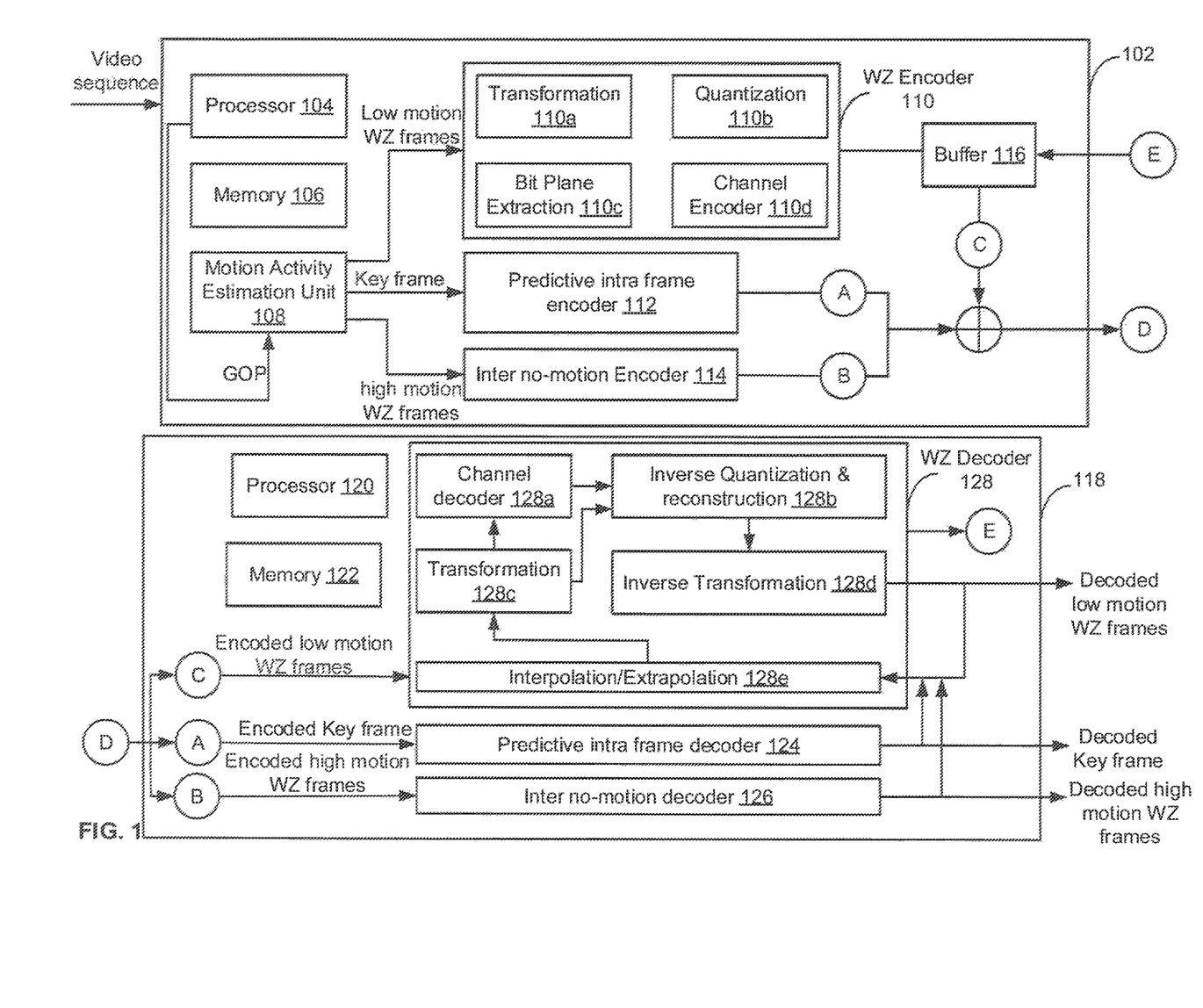
FIG. 1 illustrates a block diagram of the distributed video encoding apparatus and the distributed video decoding apparatus, according to some embodiments of the present disclosure.

FIG. 1 illustrates a block diagram of the distributed video encoding apparatus and the distributed video decoding apparatus, according to some embodiments of the present disclosure.

As shown in the FIG. 1, the distributed video encoding apparatus 102 comprises a processor 104, a memory 106, a motion activity estimation unit 108, a Wyner-Ziv (WZ) encoder 110, a predictive intra-frame encoder 112, an inter no-motion encoder 114, and a buffer 116. The WZ encoder 110 may be configured to perform at least one of transformation, quantization, bit plane extraction, and channel encoding on the low-motion WZ frames.

The processor 104 comprises suitable logic, circuitry, interfaces, and/or code that may be configured to execute a set of instructions stored in the memory 106. The processor 104 may be implemented based on a number of processor technologies known in the art. The processor 104 may work in coordination with the motion activity estimation unit 108, the WZ encoder 110, the predictive intra frame encoder 112, and the inter no-motion encoder 114 for achieving improved rate distortion performance. Examples of the processor 202 include, but are not limited to, an X86-based processor, a Reduced Instruction Set Computing (RISC) processor, an Application-Specific Integrated Circuit (ASIC) processor, a Complex Instruction Set Computing (CISC) processor, and/or other processor The memory 106 comprises suitable logic, circuitry, interfaces, and/or code that may be configured to store the set of instructions, which are executed by the processor 104. In an embodiment, the memory 106 may be configured to store one or more programs, routines, or scripts that may be executed in coordination with the processor 104. The memory 106 may be implemented based on a Random Access Memory (RAM), a Read-Only Memory (ROM), a Hard Disk Drive (HDD), a storage server, and/or a Secure Digital (SD) card.

The motion activity estimation unit 108 comprises suitable logic, circuitry, interfaces, and/or code that may be configured to determine a first value that is indicative of a cumulative motion activity associated with the at least one GOP. Further, the motion activity estimation unit 108 may be configured to classify the at least one GOP into one of one or more high-motion WZ frames and one or more low-motion WZ frames based on the determined first value. The Wyner-Ziv (WZ) encoder 110 comprises suitable logic, circuitry, interfaces, and/or code that may be configured to encode the one or more low-motion WZ frames using Wyner-Ziv encoding. The predictive intra-frame encoder 112 comprises suitable logic, circuitry, interfaces, and/or code that may be configured to encode the at least one key frame from at least one GOP using predictive intra frame encoding. The inter no-motion encoder 114 comprises suitable logic, circuitry, interfaces, and/or code that may be configured to encode the one or more high-motion WZ frames using inter no-motion encoding. The buffer 116 comprises a storage space that is utilized to store the error correction bits generated for each bit-plane array by the channel encoder 110d. In an embodiment, the buffer may be configured to transmit the stored error correction bits to the distributed video decoding apparatus.

As shown in the FIG. 1, the distributed video decoding apparatus 118 comprises a processor 120, a memory, 122, a predictive intra-frame decoder 124, an inter no-motion decoder 126, and a WZ decoder 128. The WZ decoder 128 may be configured to perform at least one of inverse transformation, inverse quantization, reconstruction, and channel decoding-on the one or more Wyner-Ziv encoded frames.

The processor 120 comprises suitable logic, circuitry, interfaces, and/or code that may be configured to execute a set of instructions stored in the memory 122. The processor 120 may be implemented based on a number of processor technologies known in the art. The processor 120 may work in coordination with the predictive intra frame decoder 124, the inter no-motion decoder 126, and the WZ decoder 128 for achieving improved rate distortion performance. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor The memory 122 comprises suitable logic, circuitry, interfaces, and/or code that may be configured to store the set of instructions, which are executed by the processor 120. In an embodiment, the memory 122 may be configured to store one or more programs, routines, or scripts that may be executed in coordination with the processor 120. The memory 122 may be implemented based on a Random Access Memory (RAM), a Read-Only Memory (ROM), a Hard Disk Drive (HDD), a storage server, and/or a Secure Digital (SD) card.

The predictive intra-frame decoder 124 comprises suitable logic, circuitry, interfaces, and/or code that may be configured to decode the at least one predictive intra encoded frame. The inter no-motion decoder 126 comprises suitable logic, circuitry, Interfaces, and/or code that may be configured to decode the one or more inter no-motion encoded frames. The WZ decoder 128 comprises suitable logic, circuitry, interfaces, and/or code that may be configured to decode the one or more Wyner-Ziv encoded frames.

In operation, the distributed video encoding apparatus is configured to receive a video sequence that comprises a plurality of frames. The processor 104 may partition the plurality of frames into at least one group of pictures based on a pre-defined GOP frame length. For example, if the plurality of frames in the received video sequence is 16 and the pre-defined GOP frame length is four, then the processor 104 may be configured to create four GOPs, with each GOP having four frames. In an embodiment, the processor 104 may mark a first frame from the received video sequence as the key frame and may repeat marking the key frame after every pre-defined GOP frame length. In an embodiment, each of the GOP comprises at least one key frame and at least one Wyner-Ziv (WZ) frame. The frame length between two key frames is the same as the pre-defined GOP length. For example, for the pre-defined GOP frame length of 4, the first frame received is marked as the key frame and subsequently 5, 9, 13 so on frames received may be marked as key frames. The processor 104 may be configured to transmit the at least one key frame and the at least one Wyner-Ziv (WZ) frame to the motion activity estimation unit 108.

The motion activity estimation unit 108 may be configured to receive the at least one key frame and the at least one Wyner-Ziv (WZ) frame associated with the at least one GOP. The motion activity estimation unit 108 may be configured to determine a first value that is indicative of a cumulative motion activity associated with the at least one GOP. In an embodiment, if the GOP includes two frames then a single motion activity between the two adjacent frames may be determined that may be represented by the first value. In another embodiment, if the GOP Includes four frames then three values that represent the motion activity values between the adjacent frames may be determined. Further, corresponding three values that represent the threshold values associated with three motion activity values may also be determined. In order to determine the cumulative motion activity associated with each GOP, the motion activity values between adjacent frames in each of the GOP may be accumulated. In an embodiment, the first value that is indicative of a cumulative motion activity may be determined based on the motion activity values between the adjacent frames in the GOP.

For example, if the GOP comprise four frames F1, F2, F3, and F4, the motion activity estimation unit 108 may determine the motion activity values between frames F1 and frame F2 for example as 2. Similarly the motion activity value between frame F2 and frame F3 may be determined to be 3 and the motion activity value between frame F3 and frame F4 may be determined to be 2. If the pre-defined threshold values associated with each of the adjacent frames is 2, then the cumulative motion activity associated with the GOP may be 8 and the cumulative threshold for the GOP may be 6.

In an embodiment, the first value may be determined based on one or more of a normalized histogram difference of a plurality of pixel values associated with a plurality of pixels between each of the adjacent frames in the at least one GOP, a normalized histogram difference between a set of pixel values of the adjacent frames within a pre-defined block size, or a normalized histogram variance difference between the set of pixel values of the adjacent frames within the pre-defined block size in each of the adjacent frames. In an embodiment, the pixel values refer to pixel luma component values or the brightness associated with each of the pixels.

In an embodiment, the motion activity estimation unit 108 may be configured to determine the normalized histogram difference of the plurality of pixel values in each of the adjacent frames in the at least one GOP. For example, the difference between 32-level histograms of adjacent frames may be determined and normalized by frame resolution. In an embodiment, the normalized histogram difference of the plurality of pixel values may be determined in accordance with equation 1 below Sum of (difference between corresponding histogram levels of adjacent frames)/frame resolution      EQUATION 1:

A person skilled in the art will understand that the scope of the disclosure should not be limited to determining the normalized histogram difference of the plurality of pixel values in each of the adjacent frames in the at least one GOP based on the aforementioned factors and using the aforementioned techniques. Further, the examples provided in supra are for illustrative purposes and should not be construed to limit the scope of the disclosure.

In an embodiment, the motion activity estimation unit 108 may be configured to the normalized histogram difference between the set of pixel values of the adjacent frames within the pre-defined block size. For example, the difference between 16-level histograms of pre-defined blocks in adjacent frames may be determined and normalized by frame resolution. Further, the pre-defined block size may be 8×8 pixels. In an embodiment, the normalized histogram difference between the set of pixel values of the adjacent frames within the pre-defined block size may be determined in accordance with equation 2 below.

Sum of all the blocks of (Sum of (difference between corresponding block histogram levels of adjacent frames))/frame resolution      EQUATION 2:

A person skilled in the art will understand that the scope of the disclosure should not be limited to determining the normalized histogram difference between the set of pixel values of the adjacent frames within the pre-defined block size based on the aforementioned factors and using the aforementioned techniques. Further, the examples provided in supra are for illustrative purposes and should not be construed to limit the scope of the disclosure.

In an embodiment, the motion activity estimation unit 108 may be configured to determine the normalized histogram variance difference between the set of pixel values of the adjacent frames within the pre-defined block size in each of the adjacent frames. For example, the difference between 16-level histogram variances of pre-defined blocks in adjacent frames may be determined and normalized by frame resolution. Further, the pre-defined block size may be 8×8 pixels. In an embodiment, the normalized histogram variance difference between the set of pixel values may be determined in accordance with equation 3 below.

Sum of all the blocks of (Sum of (difference between corresponding block histogram variances of adjacent frames))/frame resolution      EQUATION 3:

A person skilled in the art will understand that the scope of the disclosure should not be limited to determining the normalized histogram variance difference between the set of pixel values of the adjacent frames within the pre-defined block size in each of the adjacent frames based on the aforementioned factors and using the aforementioned techniques. Further, the examples provided in supra are for illustrative purposes and should not be construed to limit the scope of the disclosure.

In an alternate embodiment, the motion activity estimation unit 108 may be configured to determine the first value based on one or more methods that comprise fast motion estimation, Mean Square Error (MSE), Mean Absolute Difference (MAD), Sum of Squared Differences (SSD), Sum of Absolute Differences (SAD), Weighted Sum of Absolute Differences (WSAD), and the like.

A person skilled in the art will understand that the scope of the disclosure should not be limited to determining the first value based on the aforementioned factors and using the aforementioned techniques. Further, the examples provided in supra are for illustrative purposes and should not be construed to limit the scope of the disclosure.

The motion activity estimation unit 108 may be configured to classify at least one GOP into one of one or more high-motion WZ frames and one or more low-motion WZ frames based on the determined first value. In order to classify the at least one GOP into one of one or more high-motion WZ frames and one or more low-motion WZ frames, the motion activity estimation unit 108 may be configured to compare the first value associated with at least the one GOP with a pre-defined threshold. In an embodiment, if the first value exceeds the pre-defined threshold then the GOP may be classified into the one or more high-motion WZ frames else the GOP may be classified into the one or more low-motion WZ frames. For example, the first value that is indicative of a cumulative motion activity of the GOP is 8 and the pre-defined threshold is 6. In such a scenario, the GOP may be classified as one or more high-motion WZ frames. In another scenario, where a GOP comprises four frames and the first value leads to 60% motion activity based on the histogram, and the pre-determined threshold is 40% then the GOP may be classified as one or more high-motion WZ frames After classifying the at least one GOP into either the one or more high-motion WZ frames and the one or more low-motion WZ frames, the motion activity estimation unit 108 may be configured to transmit the key frame from the at least one GOP to the predictive intra frame encoder 112. Further, the one or more low-motion WZ frames may be transmitted to the WZ encoder 110 and the one or more high-motion WZ frames may be transmitted to the inter no-motion encoder 114.

In an embodiment, the predictive intra frame encoder 112 may be configured to receive the at least one key frame from the motion activity estimation unit 108. The predictive intra frame encoder 112 may be configured to encode the at least one key frame from at least one GOP using predictive intra frame encoding. In an embodiment, the predictive intra frame encoding comprises one of H.264 standard, MPEG2 standard, or MJPEG standard.

In an embodiment, the WZ encoder 110 may be configured to receive the one or more low-motion WZ frames from the motion activity estimation unit 108. The WZ encoder 110 may be configured to encode the one or more low-motion WZ frames using Wyner-Ziv encoding method. In an embodiment, the Wyner-Ziv encoding comprises performing at least one of transformation, quantization, bit plane extraction, and channel encoding on the one or more low-motion WZ frames. As shown in FIG. 1, the WZ encoder 110 may be configured to perform transformation 110a, quantization 110b, bit plane extraction 110c, and channel encoder 110d on the one or more low-motion WZ frames. In an embodiment, during the transformation 110a, for each low-motion WZ frame all 4×4-blocks in the low-motion WZ frame may be transformed using Discrete Cosine Transform (DCT). Further, 16 DCT bands may be formed by grouping together each of the 4×4-block transform coefficients of each low-motion WZ frame. In an embodiment, during quantization 110b uniform quantization with 2S quantization levels may be applied on every DCT band formed during transformation 110a. 'S' represents the number of bits used for quantization symbol. In an embodiment, during bit plane extraction 110c, for each DCT band, bit-plane arrays may be formed by grouping the quantized symbol bits of equal significance. In an embodiment, after bit plane extraction 110c, during channel encoding each bit-plane array may be separately channel encoded. In an embodiment, a turbo encoder may be utilized for implementing the channel encoding. In an embodiment, the error correction bits generated for each bit-plane array by the channel encoder 110d may be stored in the buffer 116 and a subset of the error correction bits may be transmitted to the distributed video decoding apparatus 118.

In an embodiment, the inter no-motion encoder 114 may be configured to receive the one or more high-motion WZ frames from the motion activity estimation unit 108. The inter no-motion encoder 114 may be configured to encode the one or more high-motion WZ frames using the inter no-motion encoding. In an embodiment, the inter no-motion encoding comprises an inter coding method that utilizes a combination of intra and bidirectional Inter prediction to generate an IB construction where I corresponds to intra and B corresponds to bidirectional Inter prediction. In an embodiment, the one or more high-motion WZ frames may be encoded using the inter no-motion encoding without using motion estimation. The inter no-motion encoding method utilizes temporal redundancy without performing motion estimation by creating the IB construction. The inter no-motion encoding method utilizes the pre-defined blocks at same location in the adjacent frames to determine motion compensation. Thus, the one or more high-motion WZ frames may be encoded using bidirectional inter prediction (B) and the first frame of the GOP may be encoded using predictive intra frame encoder. For example, if a GOP of 4 frames has a high motion activity then the encoded GOP may be represented as IBBB, where the first frame is encoded using predictive intra frame encoding (I) and the one or more high-motion WZ frames may be encoded using bidirectional inter prediction (B).

Thus, the distributed video encoding apparatus 102 is configured to encode the key frame using predictive intra frame encoding and the remaining one or more WZ frames using either inter no-motion encoding or WZ encoding based on whether the remaining one or more WZ frames correspond to the one or more high-motion WZ frames or the one or more low-motion WZ frames in the at least one GOP. For example, $1^{st}$ GOP has low motion activity and $2^{nd}$ GOP has high motion activity, where the pre-defined frame length is four. In such a scenario, the encoding of the $1^{st}$ GOP and the $2^{nd}$ GOP may be represented by IWZWZW-ZIBBB construction, where the key frame of the $1^{st}$ GOP and $2^{nd}$ GOP is encoded using predictive intra frame encoding represented by 'I', the one or more low-motion WZ frames of the $1^{st}$ GOP may be encoded using WZ encoding represented by 'WZ', and the one or more high-motion WZ frames of the $2^{nd}$ GOP may be encoded using the inter no-motion encoding method—bidirectional inter prediction represented by 'B'. In an embodiment, such hybrid distributed video encoding may results in achieving an improved rate distortion performance as compared to the conventional DVC coding apparatus.

The distributed video encoding apparatus 102 may be configured to include header information associated with each of the plurality of encoded frames. In an embodiment, distributed video encoding apparatus 102 may be configured to transmit the plurality of encoded frames along with the included header information to the distributed video decoding apparatus 118. In an embodiment, the plurality of encoded frames may comprise at least one predictive intra encoded frame, and either one or more inter no-motion encoded frames or one or more Wyner-Ziv encoded frames associated with the at least one GOP.

The processor 120 may be configured to identify the at least one predictive intra encoded frame, the one or more inter no-motion encoded frames, and the one or more Wyner-Ziv encoded frames based on header information associated with each of the plurality of encoded frames. In an embodiment, one or more bits in the starting of each of the plurality of encoded frames may represent the header information. For example, if the value in the header information corresponds to 0, then the frame is identified as the predictive intra encoded frame. If the value in the header information corresponds to 1, then the frame is identified as the inter no-motion encoded frame. If the value in the header information corresponds to 2, then the frame is identified as the Wyner-Ziv encoded frames.

After identifying the type of each of the plurality of encoded frames, the processor 120 may be configured to transmit the at least one predictive intra encoded frame to the predictive intra frame decoder 124. Further, the processor 120 may be configured to transmit the one or more inter no-motion encoded frames to the inter no-motion decoder 126. Further, the processor 120 may be configured to transmit the one or more Wyner-Ziv encoded frames to the WZ decoder 128.

After receiving the at least one predictive intra encoded frame, the predictive intra frame decoder 124 may be configured to decode the at least one predictive intra encoded frame using predictive intra decoding to output the decoded key frame. In an embodiment, the predictive intra decoding may comprise one of H.264 standard, MPEG standard, and the like. After receiving the one or more inter no-motion encoded frames, the inter no-motion decoder 126 may be configured to decode the one or more inter no-motion encoded frames using inter no-motion decoding to output the decoded one or more high-motion WZ frames. In an embodiment, the decoding of the one or more inter no-motion encoded frames may be performed based on the IB construction.

After receiving the one or more Wyner-Ziv encoded frames, the WZ decoder 128 may be configured to decode the one or more Wyner-Ziv encoded frames using Wyner-Ziv decoding. In an embodiment, the Wyner-Ziv decoding comprises performing at least one of inverse transformation, inverse quantization, reconstruction, and channel decoding on the one or more Wyner-Ziv encoded frames. As shown in FIG. 1, the WZ decoder 128, may be configured to perform channel decoding 128a, inverse quantization and reconstruction 128b, transformation 128c, Inverse transformation 128d, and Interpolation/extrapolation 128e on the one or more Wyner-Ziv encoded frames. In an embodiment, the WZ decoder 128 may receive the at least one decoded key frame and the one or more decoded high-motion WZ frames.

In an embodiment, during interpolation/extrapolation 128e the WZ decoder 128 may be configured to extract side information based on the decoded key frames, and/or the decoded one or more high-motion WZ frames. In an embodiment, the side information may correspond to noise information associated with the one or more low-motion WZ frames. In an embodiment, the side information may be extracted based on one or more techniques that comprise Motion Compensated Interpolation (MCI), and Motion Compensated Extrapolation (MCE). In an embodiment, during transformation 128c the WZ encoder 128 may be configured to transform the extracted side information using DCT. The WZ decoder 128 may be configured to transmit the transformed side information to the channel decoder that may be configured to perform the channel decoding 128a.

In an embodiment, during channel decoding 128a statistical dependency among DCT coefficients of the WZ encoded frames and extracted side information may be modeled by using a Laplacian distribution. Based on the statistical dependency of the side information, the channel decoder 128a may be configured to decode the quantized bit planes to generate an output that corresponds a decoded symbol stream. In an embodiment, the channel decoder 128a may be implemented using turbo decoder. Further, channel decoder 128a in the WZ decoder 128 may be configured to provide a feedback channel to the distributed video encoding apparatus 102 for requesting additional error correction bits, incase decoding is not successful. In an embodiment, during inverse quantization and reconstruction 128b, the WZ decoder 128 may be configured to reconstruct each DCT coefficient band based on the channel decoded symbol stream and the DCT coefficients of the side information. In an embodiment, during inverse transformation 128d after reconstruction of all DCT coefficient bands, the WZ decoder 128 may be configured to decode the encoded one or more low-motion WZ frames by performing an inverse discrete cosine transform (IDCT). Thus, by performing the above described operations the WZ decoder 128 may be configured to decode the one or more low-motion Wyner-Ziv encoded frames and output the decoded one or more low-motion WZ frames.

For the purpose of simplicity and understanding of the disclosure, the frame length in the GOP is pre-defined (static). However, a person skilled in the art will understand that the scope of the disclosure should not be limited to utilizing a pre-defined frame length of the GOP. In an alternate embodiment, a dynamic frame length of the GOP may be utilized for the implementation of the disclosed invention. A dynamic GOP length example is frame length of 4, 2, 6, 2, 4 and the like for consecutive GOPs. Further, the examples provided in supra are for illustrative purposes and should not be construed to limit the scope of the disclosure.

Figure 2:
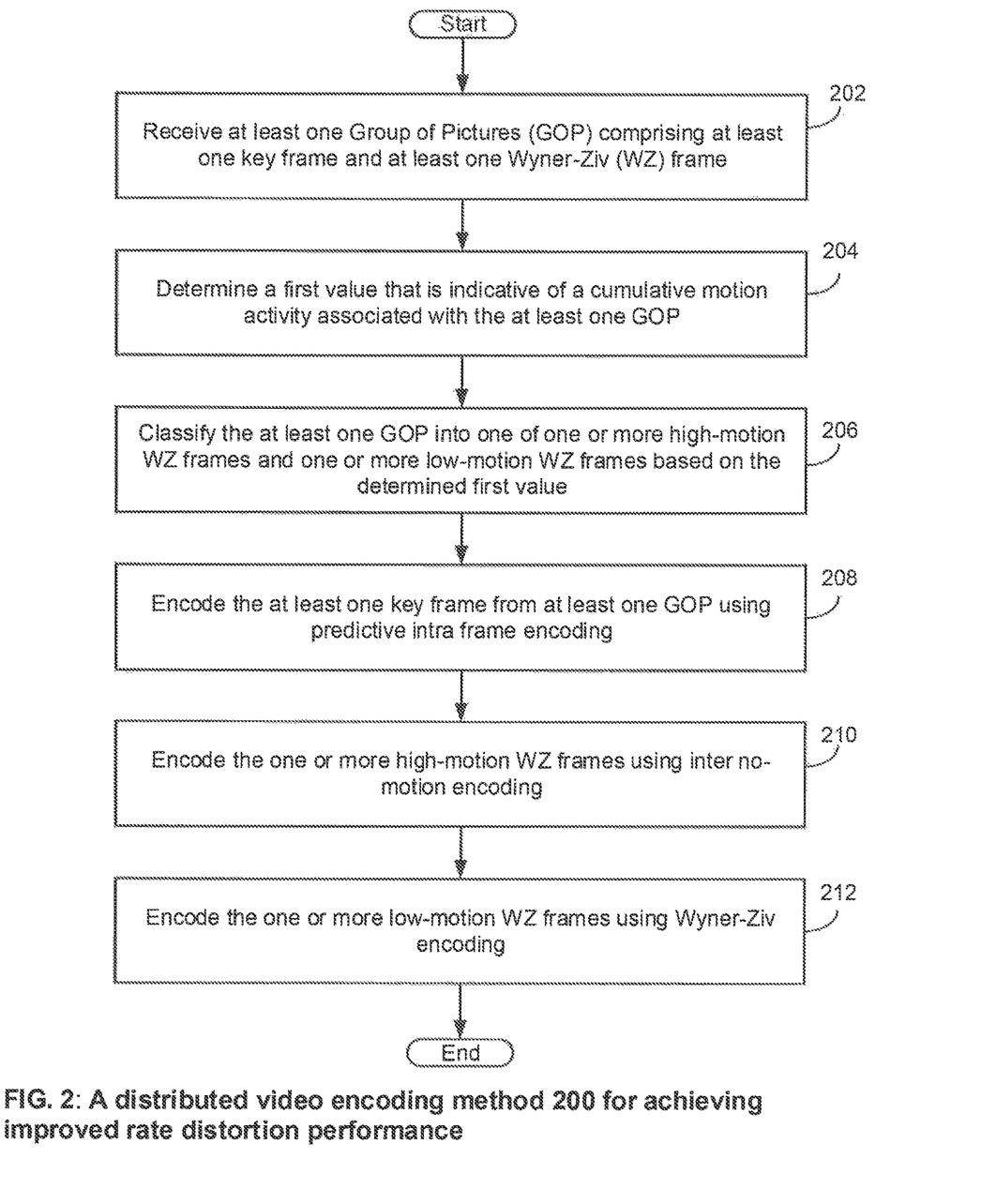
FIG. 2 is a flow diagram illustrating a distributed video encoding method for achieving improved rate distortion performance, in accordance with some embodiments of the present disclosure.

FIG. 2 is a flow diagram illustrating a distributed video encoding method 200 for achieving improved rate distortion performance, in accordance with some embodiments of the present disclosure.

The method 200 may be described in the general context of computer executable instructions. Generally, computer executable Instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to the FIG. 2, at block 202, the distributed video encoding apparatus 102 may be configured to receive at least one Group of Pictures (GOP) comprising at least one key frame and at least one Wyner-Ziv (WZ) frame. At block 204, the distributed video encoding apparatus 102 may be configured to determine a first value that is indicative of a cumulative motion activity associated with the at least one GOP. At block 206, the distributed video encoding apparatus 102 may be configured to classify the at least one GOP into one of one or more high-motion WZ frames and one or more low-motion WZ frames based on the determined first value. In an embodiment, in order to classify the at least one GOP into one of one or more high-motion WZ frames and one or more low-motion WZ frames, the distributed video encoding apparatus 102 may be configured to compare the first value associated with at least the one GOP with a pre-defined threshold. At block 208, the distributed video encoding apparatus 102 may be configured to encode the at least one key frame from at least one GOP using predictive intra frame encoding. At block 210, the distributed video encoding apparatus 102 may be configured to encode the one or more high-motion WZ frames using inter no-motion encoding. At block 212, the distributed video encoding apparatus 102 may be configured to encode the one or more low-motion WZ frames using Wyner-Ziv encoding.

Figure 3:
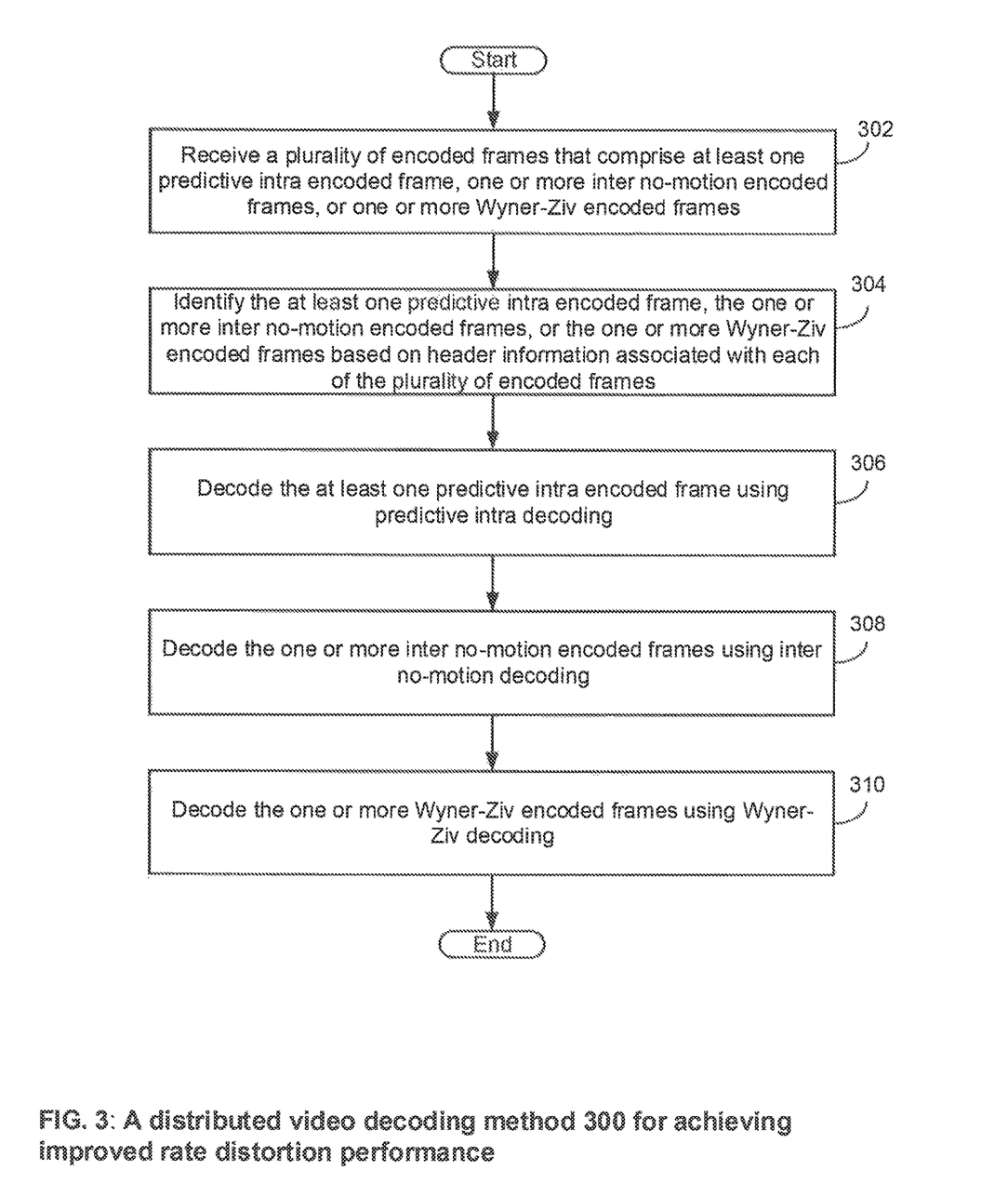
FIG. 3 is a flow diagram illustrating a distributed video decoding method for achieving improved rate distortion performance, in accordance with some embodiments of the present disclosure.

FIG. 3 is a flow diagram illustrating a distributed video decoding method 300 for achieving improved rate distortion performance, in accordance with some embodiments of the present disclosure.

The method 300 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

With reference to the FIG. 3, at block 302, the distributed video decoding apparatus 118 may be configured to receive a plurality of encoded frames that comprise at least one predictive intra encoded frame, and either one or more inter no-motion encoded frames, or one or more Wyner-Ziv encoded frames At block 304, the distributed video decoding apparatus 118 may be configured to identify the at least one predictive intra encoded frame, the one or more inter no-motion encoded frames, or the one or more Wyner-Ziv encoded frames based on header information associated with each of the plurality of encoded frames. At block 306, the distributed video decoding apparatus 118 may be configured to decode the at least one predictive intra encoded frame using predictive intra decoding. At block 308, the distributed video decoding apparatus 118 may be configured to decode the one or more inter no-motion encoded frames using inter no-motion decoding. At block 310, the distributed video decoding apparatus 118 may be configured to decode the one or more Wyner-Ziv encoded frames using Wyner-Ziv decoding. In an embodiment, the Wyner-Ziv decoding comprises performing at least one of inverse transformation, inverse quantization, reconstruction, and channel decoding on the one or more Wyner-Ziv encoded frames.

Computer System

Figure 4:
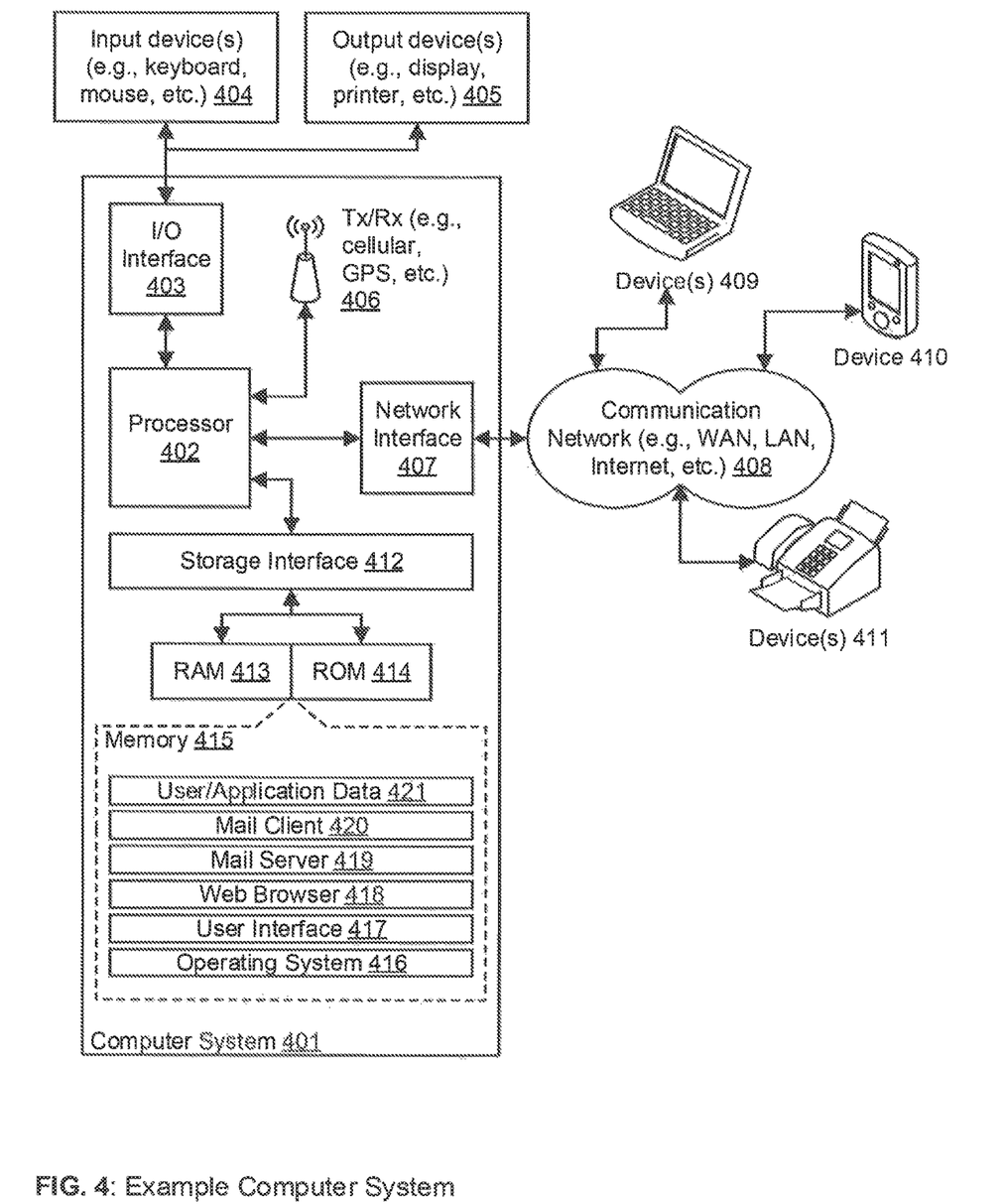
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for achieving improved rate distortion performance by using the distributed video encoding apparatus 102 and the distributed video decoding apparatus 118. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component.

The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming Interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described apparatuses and methods for achieving improved rate distortion performance by using the distributed video encoding apparatus 102 and the distributed video decoding apparatus 118. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A distributed video encoding method for achieving improved rate distortion performance, the method comprising:
    receiving, by a distributed video encoding apparatus, at least one Group of Pictures (GOP) comprising a key frame and at least one Wyner-Ziv (WZ) frame, wherein the at least one GOP includes three or more frames;
    determining, by the distributed video encoding apparatus, a first value that is indicative of a cumulative motion activity of a plurality of pixel values associated with a plurality of pixels between each of the adjacent frames in the at least one GOP;
    classifying, by the distributed video encoding apparatus, the at least one GOP into one of one or more high-motion WZ frames and one or more low-motion WZ frames based on the determined first value;
    encoding the key frame from at least one GOP using predictive intra frame encoding;
    encoding, by the distributed video encoding apparatus, the one or more high-motion WZ frames using inter no-motion encoding, wherein the inter no-motion encoding comprises an inter coding method that utilizes a combination of intra and bidirectional inter prediction to generate an IB construction where I corresponds to intra and B corresponds to bidirectional inter prediction; and
    encoding, by the distributed video encoding apparatus, the one or more low-motion WZ frames using Wyner-Ziv encoding, wherein the first value is determined based on one or more of a normalized histogram difference of a plurality of pixel values associated with a plurality of pixels between each of the adjacent frames in the at least one GOP, a normalized histogram difference between a set of pixel values of the adjacent frames within a pre-defined block size, or a normalized histogram variance difference between the set of pixel values of the adjacent frames within the pre-defined block size in each of the adjacent frames.

2. The method of claim 1, wherein the predictive intra frame encoding comprises one of H.264 standard, MPEG2 standard, or MJPEG standard.

3. The method of claim 1, wherein classifying the at least one GOP into one of the one or more high-motion WZ frames and the one or more low-motion WZ frames comprises comparing the first value associated with at least the one GOP with a pre-defined threshold.

4. The method of claim 1, wherein the Wyner-Ziv encoding comprises performing at least one of transformation, quantization, bit plane extraction, and channel encoding on the one or more low-motion WZ frames.

5. A distributed video encoding apparatus to achieve improved rate distortion performance, the distributed video encoding apparatus comprising:
    a processor; and a memory communicatively coupled to the processor, wherein the memory stores processor instructions, which on execution, causes the processor to:

receive at least one Group of Pictures (GOP) comprising a key frame and at least one Wyner-Ziv (WZ) frame, wherein the at least one GOP includes three or more frames;

determine a first value that is indicative of a cumulative motion activity of a plurality of pixel values associated with a plurality of pixels between each of the adjacent frames in the at least one GOP;

classify the at least one GOP into one of one or more high-motion WZ frames and one or more low-motion WZ frames based on the determined first value;

encode the key frame from at least one GOP using predictive intra frame encoding;

encode the one or more high-motion WZ frames using inter no-motion encoding wherein the inter no-motion encoding comprises an inter coding method that utilizes a combination of intra and bidirectional inter prediction to generate an IB construction where I corresponds to intra and B corresponds to bidirectional inter prediction; and encode the one or more low-motion WZ frames using Wyner-Ziv encoding, wherein the first value is determined based on one or more of a normalized histogram difference of a plurality of pixel values associated with a plurality of pixels between each of the adjacent frames in the at least one GOP, a normalized histogram difference between a set of pixel values of the adjacent frames within a pre-defined block size, or a normalized histogram variance difference between the set of pixel values of the adjacent frames within the pre-defined block size in each of the adjacent frames.

6. The distributed video encoding apparatus of claim 5, wherein the predictive intra frame encoding comprises one of H.264 standard, MPEG2 standard, or MJPEG standard.

7. The distributed video encoding apparatus of claim 5, wherein the processor is configured to classify the at least one GOP into one of the one or more high-motion WZ frames and the one or more low-motion WZ frames comprises comparing the first value associated with the at least one GOP with a pre-defined threshold.

8. The distributed video encoding apparatus of claim 5, wherein the processor is configured to perform the Wyner-Ziv encoding that comprises at least one of transformation, quantization, bit plane extraction, and channel encoding on the one or more low-motion WZ frames.

9. A non-transitory computer-readable storage medium having stored thereon, a set of computer-executable instructions for causing a computer comprising one or more processors to perform steps comprising:

receiving, by a distributed video encoding apparatus, at least one Group of Pictures (GOP) comprising a key frame and at least one Wyner-Ziv (WZ) frame, wherein the at least one GOP includes three or more frames;

determining, by the distributed video encoding apparatus, a first value that is indicative of a cumulative motion activity of a plurality of pixel values associated with a plurality of pixels between each of the adjacent frames in the at least one GOP;

classifying, by the distributed video encoding apparatus, the at least one GOP into one of one or more high-motion WZ frames and one or more low-motion WZ frames based on the determined first value;

encoding the key frame from at least one GOP using predictive intra frame encoding;

encoding, by the distributed video encoding apparatus, the one or more high-motion WZ frames using inter no-motion encoding, wherein the inter no-motion encoding comprises an inter coding method that utilizes a combination of intra and bidirectional inter prediction to generate an IB construction where I corresponds to intra and B corresponds to bidirectional inter prediction; and encoding, by the distributed video encoding apparatus, the one or more low-motion WZ frames using Wyner-Ziv encoding, wherein the first value is determined based on one or more of a normalized histogram difference of a plurality of pixel values associated with a plurality of pixels between each of the adjacent frames in the at least one GOP, a normalized histogram difference between a set of pixel values of the adjacent frames within a pre-defined block size, or a normalized histogram variance difference between the set of pixel values of the adjacent frames within the pre-defined block size in each of the adjacent frames.

* * * * *